United States Patent
Nowak et al.

(10) Patent No.: US 6,304,825 B1
(45) Date of Patent: Oct. 16, 2001

(54) ROTARY ENCODER ERROR COMPENSATION SYSTEM AND METHOD FOR PHOTORECEPTOR SURFACE MOTION SENSING AND CONTROL

(75) Inventors: William J. Nowak; Kevin M. Carolan, both of Webster; Michael R. Furst; Orlando J. Lacayo, both of Rochester, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/232,653

(22) Filed: Jan. 19, 1999

(51) Int. Cl.[7] .................................................. G06F 702/94
(52) U.S. Cl. .................. 702/94; 702/94; 340/870.32; 341/119; 399/49; 399/167
(58) Field of Search .................................. 702/94; 347/4; 399/78, 167

(56) References Cited

U.S. PATENT DOCUMENTS

| | | | |
|---|---|---|---|
| 3,705,400 | * 12/1972 | Cordes, Jr. | 341/118 |
| 4,710,889 | * 12/1987 | Wason | 702/94 |
| 4,712,106 | * 12/1987 | McNally | 340/870.32 |
| 4,847,660 | * 7/1989 | Wheatley, Jr. et al. | 399/167 |
| 4,912,468 | * 3/1990 | Rust | 341/119 |
| 5,119,128 | 6/1992 | Cherian . | |
| 5,160,946 | 11/1992 | Hwang . | |
| 5,287,162 | * 2/1994 | de Jong et al. | 399/49 |
| 5,537,190 | 7/1996 | Folkins et al. . | |
| 5,678,144 | * 10/1997 | Osaki et al. | 399/167 |
| 5,889,534 | * 3/1999 | Johnson et al. | 347/19 |

FOREIGN PATENT DOCUMENTS 0 629 927 A2   12/1994   (EP) .

* cited by examiner

*Primary Examiner*—Arthur T. Grimley
*Assistant Examiner*—Mohamed Charioui
(74) *Attorney, Agent, or Firm*—Oliff & Berridge, PLC

(57) ABSTRACT

A rotary encoder error compensation system for use in a marking device with a rotary encoder includes an error correction logic circuit and an error correction table linked to the error correction logic circuit. The rotary encoder is configured to generate an encoder signal indicating a detected position of a rotating element and has a known rotary encoder error. The error correction logic circuit receives the encoder signal from the rotary encoder. The error correction table includes normalized error correction values. The error correction logic circuit accesses the error correction table based on the detected position of the rotating element and the known rotary encoder error and obtains one of the normalized error correction values corresponding to the detected position of the rotating element and the known rotary encoder error.

19 Claims, 7 Drawing Sheets

ROTARY ENCODER ERROR COMPENSATION SYSTEM AND METHOD FOR PHOTORECEPTOR SURFACE MOTION SENSING AND CONTROL

BACKGROUND OF THE INVENTION

1. Field of Invention

This invention relates to marking devices, and in particular to ensuring precise registration between an original image and a reproduced image by correcting for deviations in the moving image receiving surface position/speed based on sensed data.

2. Description of Related Art

Ensuring that images in a marking system are accurately reproduced requires precise registration between the original image and the surface receiving the reproduced image. Particularly in the case of color images, in which some colors of the original image are matched by overlapping two or more primary ink colors, precise registration is important. Precise registration prevents the appearance of defects (e.g., a border between two colors not present in the original image) caused by slight misalignment of the marking element with respect to the corresponding area of the image receiving surface (e.g., a photoreceptor or a marking medium) at the time of the reproduced image is transferred.

Systems involving a moving image receiving surface (e.g., a belt or a drum) on which the original image is reproduced present even more difficult registration problems. In these systems, the transfer of the reproduced image must also be timed with respect to the advancing surface to ensure that the received image is in correct registration. Current standards require that images be registered within 15 $\mu$m for DC registration shifts and as close as 2 $\mu$m for AC registration shifts in the 1.0 to 1.5 cycles/mm range. Typically, DC registration shifts are errors that are constant throughout an image, whereas AC registration shifts are errors that change throughout the image.

As are known, various errors in a moving surface system can contribute to imprecise registration. In endless belt systems, there may be slight differences in belt speed at different points on the belt due to "runout" errors (i.e., errors caused by slight eccentricities in the rolls that support the belt). Similar errors may occur in rotating drum systems. As a result of runout errors, the velocity of a point on the image receiving surface may not be constant over an entire revolution of the image receiving surface.

In some moving surface systems, the moving surface includes registration marks that are optically sensed by the marking device to allow correction for small changes in the velocity of the moving surface by, e.g., varying the gearing slightly. See, e.g., commonly assigned U.S. Pat. No. 5,160,946. Using registration marks is undesirable in certain applications, however, because these marks must be removed so they are not visible in the final image.

According to one approach, as disclosed in European Patent Publication No. 062992 7A2 (EP 927) signals from a rotary encoder sensing device coupled to the rotating structure are used to measure displacement of the moving surface. The rotary encoder is mounted to rotate with one of the rolls that supports the belt or at another point in the belt circuit allowing accurate measurement of the moving surface. The rotary encoder records the displacement of the belt, and this information is transmitted to a circuit that controls and drives the rolls, allowing any necessary adjustments in roll speed (and thus, belt speed) to be made. Based on the feedback provided by the then rotary encoder, the motion of the moving surface is controlled by modulating an amount of delay such that images are transferred to the moving surface in proper registration.

As is disclosed in commonly assigned U.S. Pat. No. 5,119,128, which is incorporated herein by reference, the rotary encoder is positioned to rotate between a light source and an opposing photodetector. The rotary encoder is essentially a disk assembly with transparent areas and opaque areas. When the disk assembly is positioned such that one of the transparent areas is aligned between the light source and the photodetector, a light beam is transmitted through the transparent area and detected by the photodetector. When an opaque area of the disk assembly is aligned between the light source and the photodetector, the light beam is blocked, the photodetector senses the blockage of light, and the photodetector emits an electrical pulse. As the rotary encoder rotates, a series of such pulses are generated, and can be used to indicate the timing of the rotation of the roll and/or belt for coordination with other events. As a result, the number and position of the opaque areas on the disk assembly can be set to provide information on the relative angular displacement of the roll and/or belt.

The rotary encoder itself, as well as the particular roll or other rotating structure with which the rotary encoder is associated (hereinafter the "encoder roll"), have a runout error (hereinafter the "rotary encoder error") that causes potential registration problems. The component of the rotary encoder error due to the rotary encoder itself is generally greater than the component due to the encoder roll. Because the encoder roll is used to set the velocity of the moving surface and thus affects the entire system, correcting the rotary encoder error is highly desirable.

In EP 927, the rotary encoder error is corrected by correcting the period of each individual pulse output from the encoder. Multi-bit period time correction values corresponding to each individual pulse of the encoder signal are stored in a table. The period time correction values are the sum of a positive fixed time and a positive or negative corrective time. A corrected encoder signal is produced by a delay device that delays each pulse by its period time correction value.

If the approach to correcting the rotary encoder error requires storing values for all deviations from nominal values of a roll surface corresponding to each angular displacement (i.e., each line pair) of the rotary encoder, the table becomes large. As a result, memory requirements and processing speed increase.

Accordingly, it would be desirable to provide a rotary encoder error correction system and method to correct rotary encoder errors without requiring measurement and storage of all actual deviations for each rotational displacement.

SUMMARY OF THE INVENTION

According to the invention, a rotary encoder error compensation system and method for use in a marking device with a rotary are provided. The rotary encoder is configured to generate an encoder signal indicating a detected position of a rotating element and having a rotary encoder error. The rotary encoder error compensation system includes an error correction logic circuit and an error correction table linked to the error correction logic circuit.

The error correction logic circuit receives the encoder signal from the rotary encoder. The error correction table includes normalized error correction values. The error correction logic circuit accesses the error correction table based on the detected position of the rotating element and the rotary encoder error and obtains one of the normalized error correction values corresponding to the detected position of the rotating element and the rotary encoder error.

The error correction logic circuit preferably generates a corrected encoder signal based on the encoder signal received from the rotary encoder and the normalized error correction value.

The normalized error correction values are preferably sine wave values. The sine wave values are preferably based on a sine wave having an amplitude of unity.

The rotary encoder error has an amplitude and a phase, and the error correction logic circuit preferably accesses the error correction table based on the phase of the rotary encoder error. The normalized error correction value corresponding to the detected position is preferably offset from the phase of the rotary encoder error by 180 degrees.

The error correction logic circuit preferably multiplies the normalized error correction value corresponding to the detected position by the amplitude of the rotary encoder error to determine a modulated delay. The error correction logic circuit preferably adds the modulated delay to a fixed delay to determine a corrected encoder signal.

The rotary encoder compensation system preferably includes an amplitude memory that stores the amplitude and a phase memory that stores the phase. The error correction circuit preferably resets the phase upon receiving an index pulse from the rotary encoder.

BRIEF DESCRIPTION OF THE DRAWINGS

Preferred embodiments of the invention will be described with reference to the following drawings, wherein like reference numerals refer to like elements, and wherein.

DETAILED DESCRIPTION OF PREFERRED EMBODIMENTS

Figure 1:
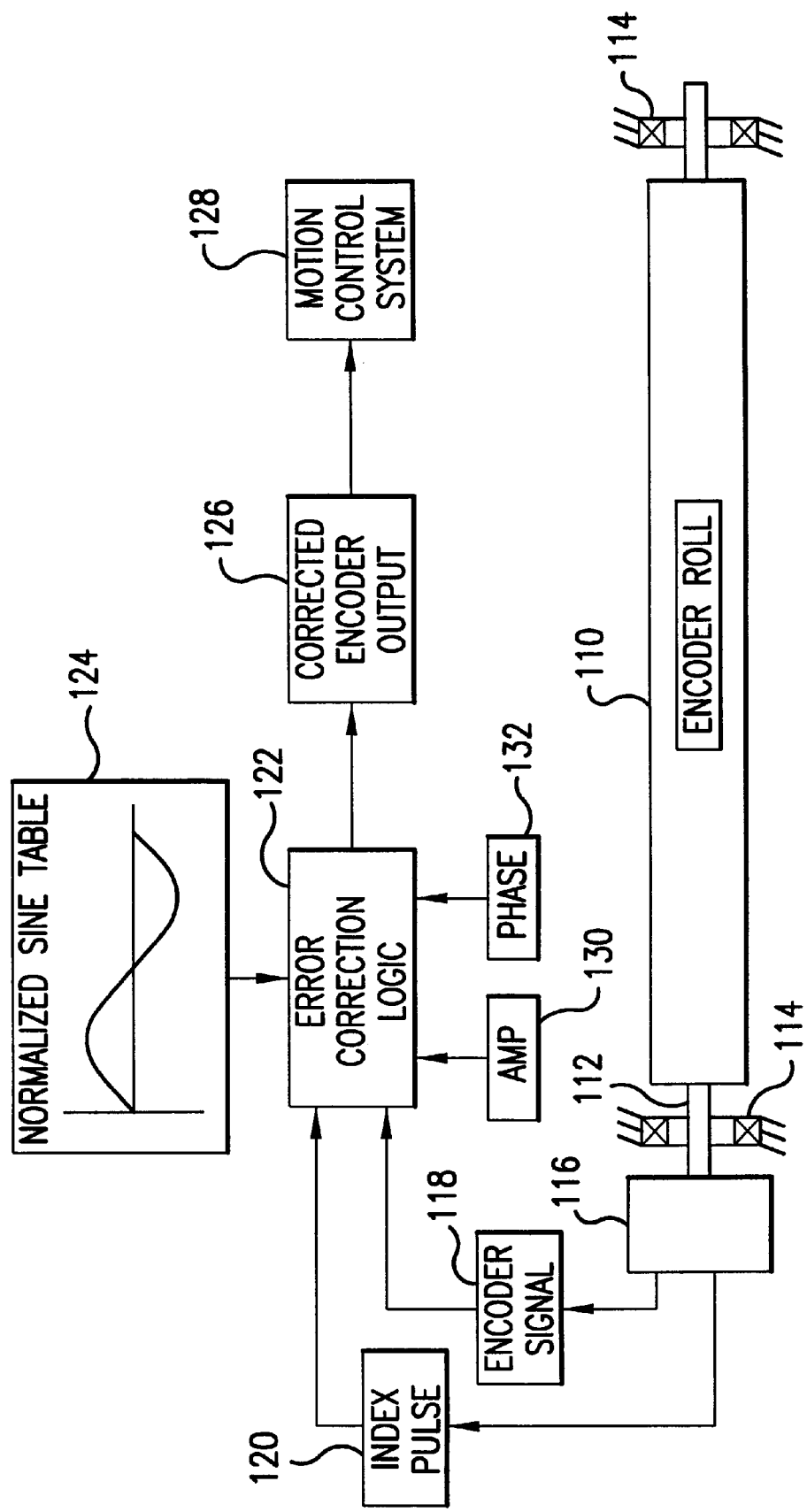
FIG. 1 is a schematic block diagram showing an encoder coupled to an encoder roll and the circuit for sensing and correcting errors in the rotary encoder signal.

FIG. 1 shows an encoder roll 110 of a marking device system. In a preferred embodiment, the encoder roll 110, together with at least one other downstream roll (not shown), support a moving photoreceptor surface (also not shown) to which an original image is transferred. In an alternative embodiment, the image is transferred directly to the encoder roll 110. The encoder roll 110 rotates about a shaft 112, which His supported by bearings 114 at either end of the shaft 112.

An encoder 116 is coupled to the encoder roll 110. The encoder 116, which is preferably a known rotary encoder, measures the rotational displacement of the encoder roll 110. The rotational displacement information measured by the encoder 116 can be converted into linear displacement (i.e., position) or velocity information. The information from the encoder 116 is fed back to a motion control system 128 that controls the motion of the moving photoreceptor surface.

According to the invention, the information from the rotary encoder is first corrected to account for rotary encoder error so that the motion control system 128 can use corrected information to control the moving photoreceptor surface. The encoder 116 produces an encoder signal 118, which is fed to an error correction logic circuit 122 linked to the encoder 116. The encoder signal 118 is a digital square wavetrain. The encoder 116 also produces an index pulse 120, which is also fed to the error correction logic circuit 122. One index pulse 120 is produced for each revolution of the encoder 116.

As stated, the rotary encoder error is due to runout errors resulting from eccentricities in the encoder 116 and the encoder roll 110. The rotary encoder error is periodic in nature and constant over time, except to the extent that the error changes due to operating conditions (e.g., because of increases in the temperature of the encoder 116 and the encoder roll 110).

The rotary encoder error can be represented as a sinusoidal waveform having an amplitude and a phase. The rotary encoder error can be measured at the factory or in the field, as is detailed below. Because the rotary encoder error is specific to each encoder 116/encoder roll 110, the rotary encoder error must be revised when a new encoder 16/encoder roll 110 is installed.

Depending upon the quantities being measured, the amplitude of the rotary encoder error can be measured in terms of deviation (i.e., the amount by which the diameters of the encoder 116/encoder roll 110 differ from nominal values) or speed of the moving surface (i.e., deviation per unit time). The phase of the rotary encoder error represents the time by which the rotary encoder error is offset from the origin of a normal sine wave. The frequency of the rotary encoder is directly related to the diameters of the encoder 16/encoder roll 110 and the position/speed of the moving surface.

Because the rotary encoder error is sinusoidal in nature, the rotary encoder error in the encoder signal 118 may be corrected by subtracting a sinusoidal function having an equivalent amplitude, but shifted 180 degrees out of phase. Accordingly, it has been found that the only information necessary to correct a particular encoder signal is the amplitude and phase of the rotary encoder error.

According to the invention, a normalized sine wave table 124 is linked to the error correction logic circuit 122. The sine wave table 124 is said to be normalized because it contains sine values of a normal sine wave having an amplitude of unity and a phase shift of zero. The normalized sine wave table 124 is accessed by the error correction logic circuit 122 to determine a normalized sine value corresponding to a known rotary encoder error. In a preferred embodiment, the sine values in the normalized sine wave table 124 are fixed and need not be updated. Alternatively, the sine values need not be stored, but could be calculated as needed. The number of sine wave values included in the normalized sine wave table 124 depends upon the desired error correction resolution. In a preferred embodiment, the normalized sine wave table includes 32 values (i.e., a sine value for each 11.25 degrees) corresponding to the resolution of the encoder 116. The table size should reflect the accuracy required in reproducing the error, the encoder frequency and resolution.

The error correction logic circuit 122 is linked to an amplitude memory 130 and a phase memory 132 that store, respectively, the amplitude and phase of the rotary encoder error. The error correction logic circuit 122 accesses the normalized sine wave table 124 based on the known phase of the rotary encoder error from the phase memory 132, and obtains a sine value for an angle offset from the known phase by 180 degrees. A corrected encoder output signal 126 is generated by multiplying the sine value by the known amplitude from the amplitude memory 130, thereby producing a corrected encoder output 126. The corrected encoder output 126 is then output to the motion control system 128. As a result, the effect of rotary encoder error in controlling the motion of the moving surface is eliminated or at least substantially reduced.

Figure 2:
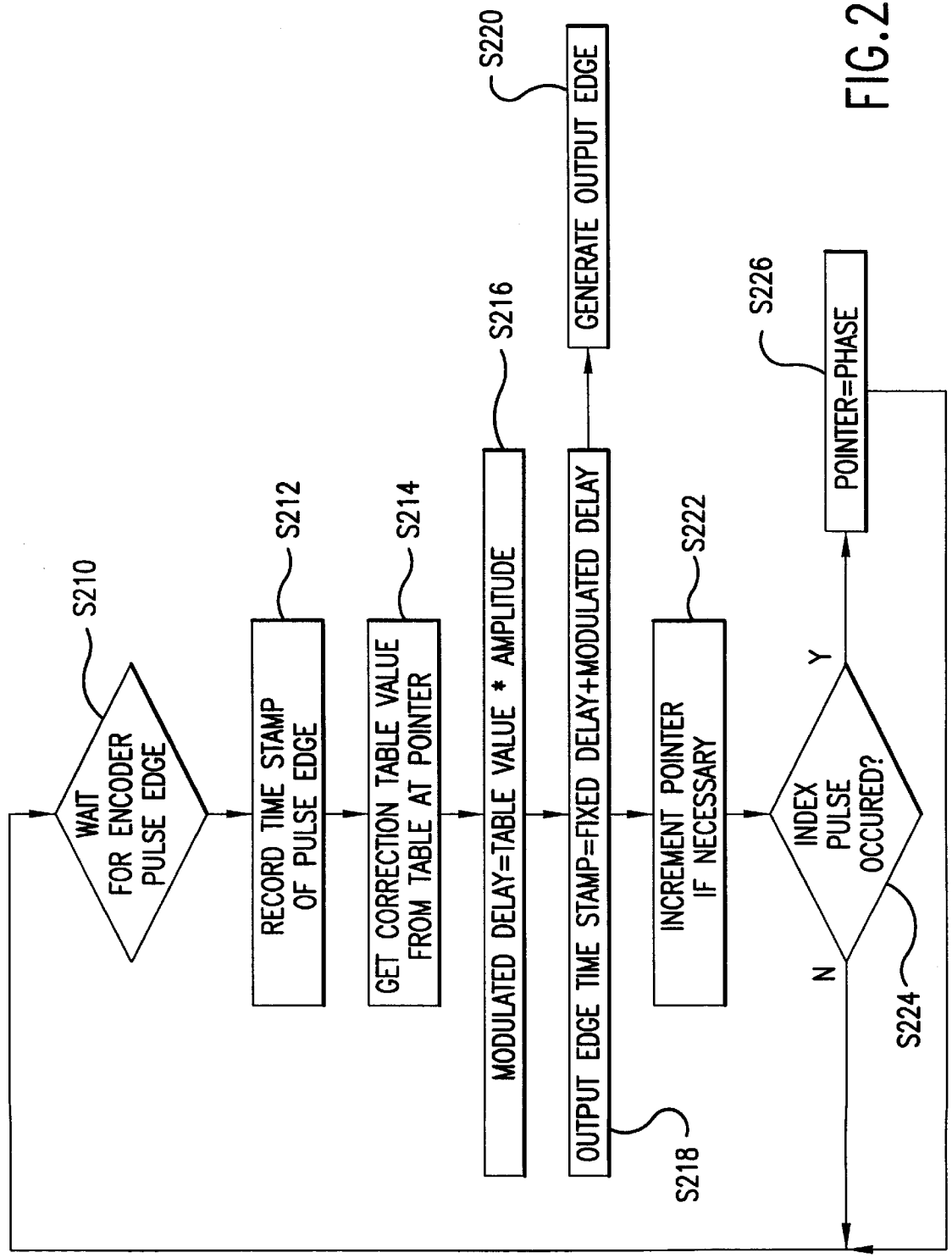
FIG. 2 is a detailed block diagram of the encoder error correction algorithm according to the invention.

FIG. 2 is a detailed flowchart showing the steps performed in correcting the encoder error. In step S210, the error correction logic circuit 122 awaits receipt of an edge of the encoder signal 118. In step S212, the error correction logic circuit 122 receives the encoder signal 118 representing the actual position/speed of the moving surface, and records a timestamp representing the time of receipt. In step S214, the error correction logic circuit 122 accesses the normalized sine wave table 124 at a pointer designating a sine value corresponding to the known phase of the rotary encoder error.

In step S216, a modulated delay is set to equal the sine value from the normalized sine wave table 124 multiplied by the known amplitude of the rotary encoder error. The units of the delay correspond to the time base of the electronic control circuitry. For example, if an Intel 80C51FA microcontroller at 16 MHz is used, the delay is measured in increments of 250 ns.

In step S218, an output edge timestamp is set to equal the sum of a predetermined fixed delay and the modulated delay determined in step S216. The fixed delay is a predetermined amount set to accommodate negative correction values, yet still yield a positive output edge time stamp. The fixed delay is the delay in time between when the encoder signal 118 is received and when the encoder signal 118 is output (with no correction). In step S220, an output edge of the corrected encoder output signal 126, which has been corrected for the rotary encoder error, is generated. In step S222, the pointer in the normalized sine wave table 124 is incremented, if necessary.

In one embodiment, the pointer is incremented in synchronization with each pulse of the encoder signal 118. Therefore, the rotary encoder error corresponding to the interval between adjacent pulses is corrected precisely. In an alternative embodiments, it may be sufficient to correct the error only over longer time periods, e.g., every eight pulses of the encoder signal 118, depending, e.g., upon the desired resolution and system hardware constraints.

In step S224, the error correction logic circuit 122 determines whether a next index pulse has been received. If the next index pulse has been received, the pointer is reset equal to the phase of the rotary encoder error in step S226, and the process returns to step S210. If the next index pulse 120 has not been received in step S224, the count is incremented in step S228 and the process returns to step S210.

Figure 3:
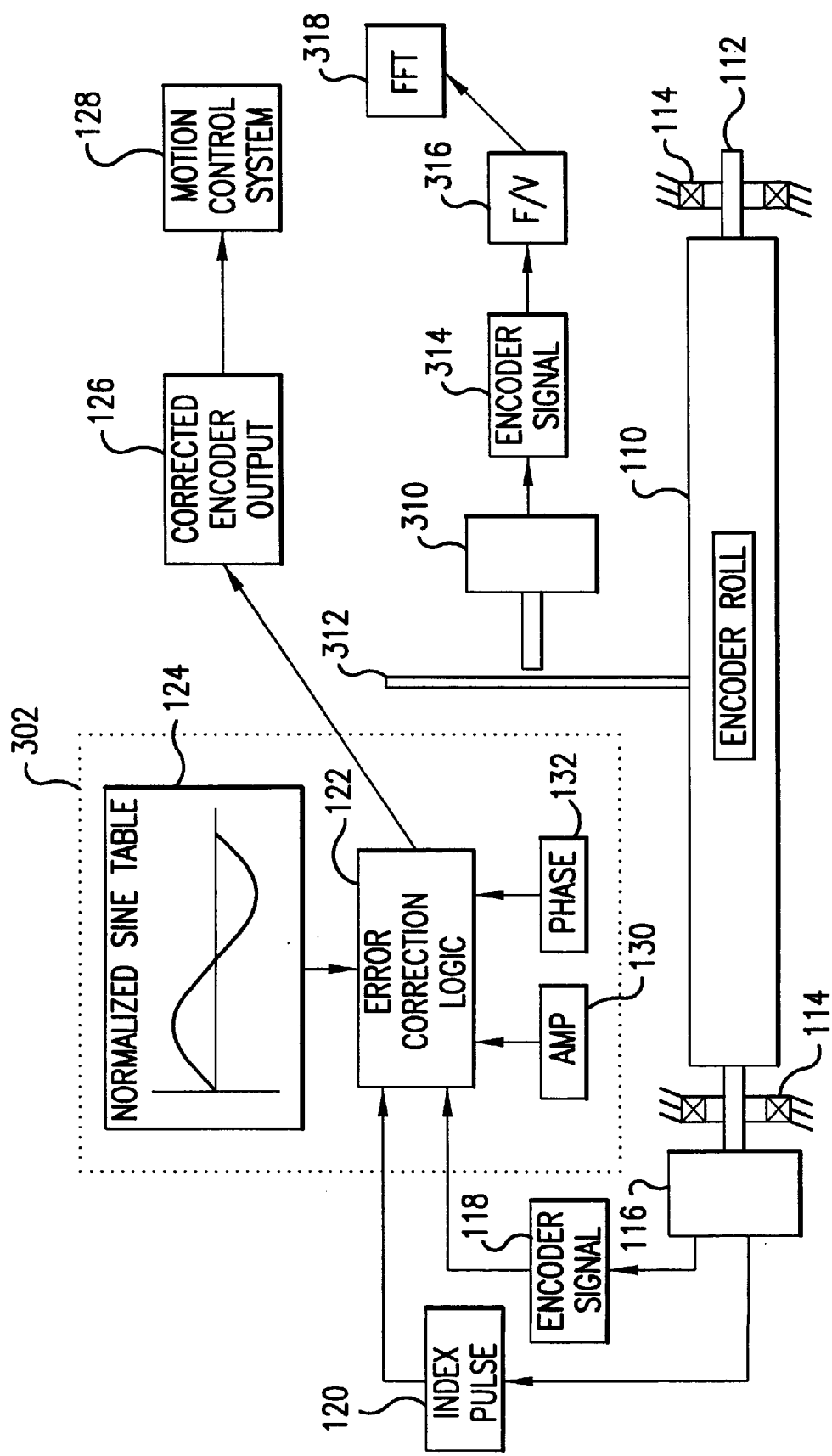
FIG. 3 is a schematic block diagram showing another embodiment in which the error correction elements are included in the processing circuitry of the marking device.

FIG. 3 shows an embodiment of the invention created for a laboratory simulation. FIG. 3 shows the embodiment of FIG. 1, together with error measurement apparatus and circuitry for measuring the rotary encoder error. In the embodiment of FIG. 3, the amplitude memory 130 and the phase memory 132 are not used initially, because the known amplitude and phase of the rotary encoder error have not yet been determined. As shown by the dotted outline, the error correction logic circuit 122, together with the normalized sine wave table 124, were implemented on a separate controller, e.g., an Intel 80C51FA microcontroller or similar device. However, the error correction logic circuit 122 and/or the normalized sine value table 124 can be implemented in the conventional motion control system circuit 128 without additional hardware.

A surface encoder 310 is positioned in conjunction with a detecting element 312. In a preferred embodiment, the surface encoder 312 is a wheel of sufficiently different diameter than the encoder roll (to differentiate between the two signals in the frequency domain) to record actual deviation in the encoder roll 110. The surface encoder 310 generates a surface encoder signal 314 (representing the variation in diameter of the encoder roll 110 over time throughout one revolution), which is fed to a frequency/voltage conversion unit 316 to develop a FFT (fast Fourier transform) in the FFT device 318. The FFT of the converted surface encoder signal 314 represents the rotary encoder error. Therefore, the amplitude of the rotary encoder error can be determined from the FFT of the converted surface encoder signal 314. The phase is determined by either: (1) comparing the index pulse 120 with the analog encoder signal output from the frequency/voltage conversion unit 316 and determining the phase value that will be 180 degrees out of phase with the measured signal; or (2) performing an iterative process of adjusting the phase value used in the correction process until the error signal strength of the corrected encoder output signal 126 is minimized (in this case, an F/V conversion device and FFT would also be employed to measure the corrected encoder output signal 126). The amplitude and phase are stored in the amplitude memory 130 and the phase memory 132, respectively, for future use in on-line correction, as in the embodiment of FIGS. 1 and 2.

Figure 4:
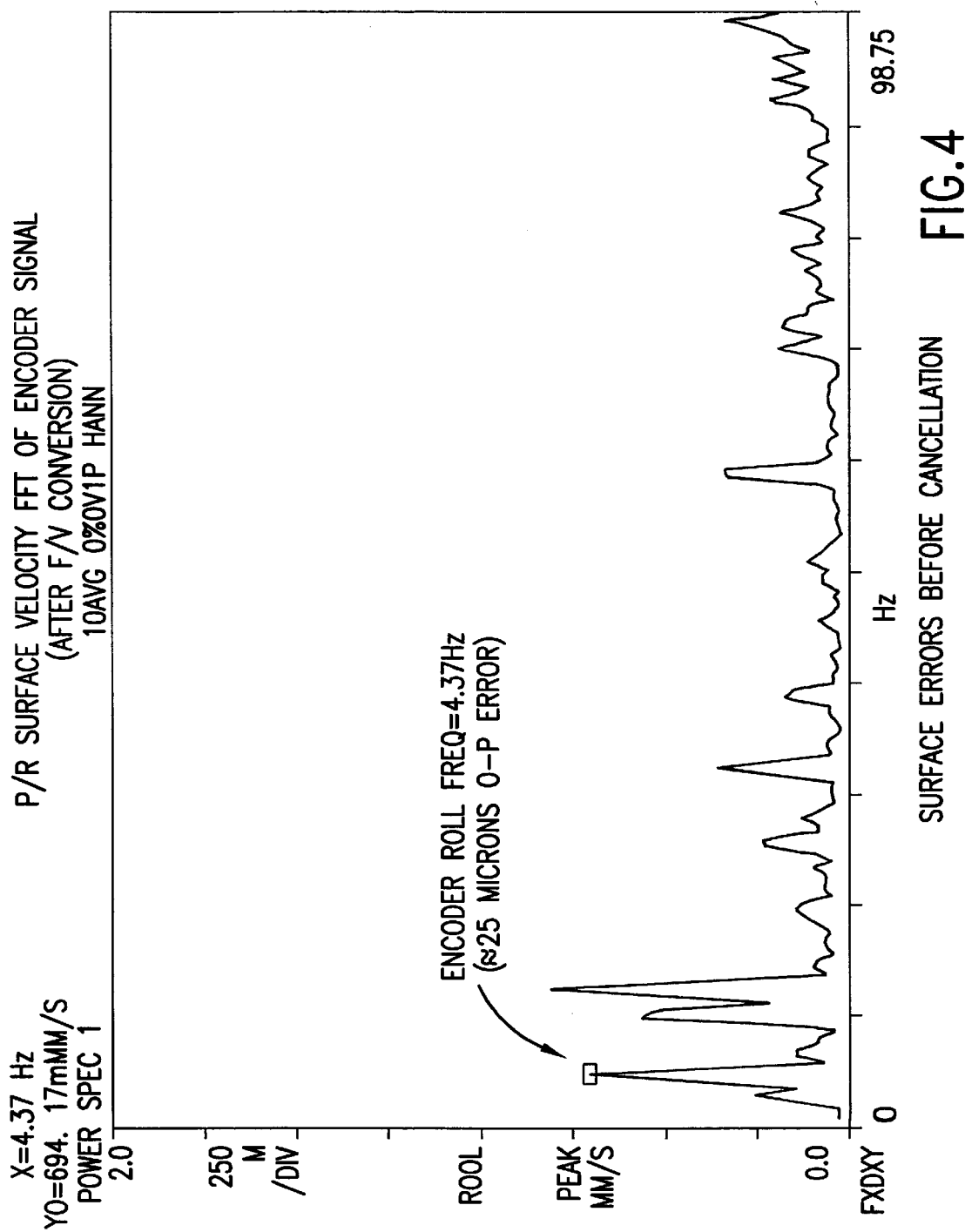
FIG. 4 is a graph of rotary encoder error frequency versus photoreceptor surface velocity showing the amplitude of the rotary encoder error at 4.37 Hz with no correction.
Figure 5:
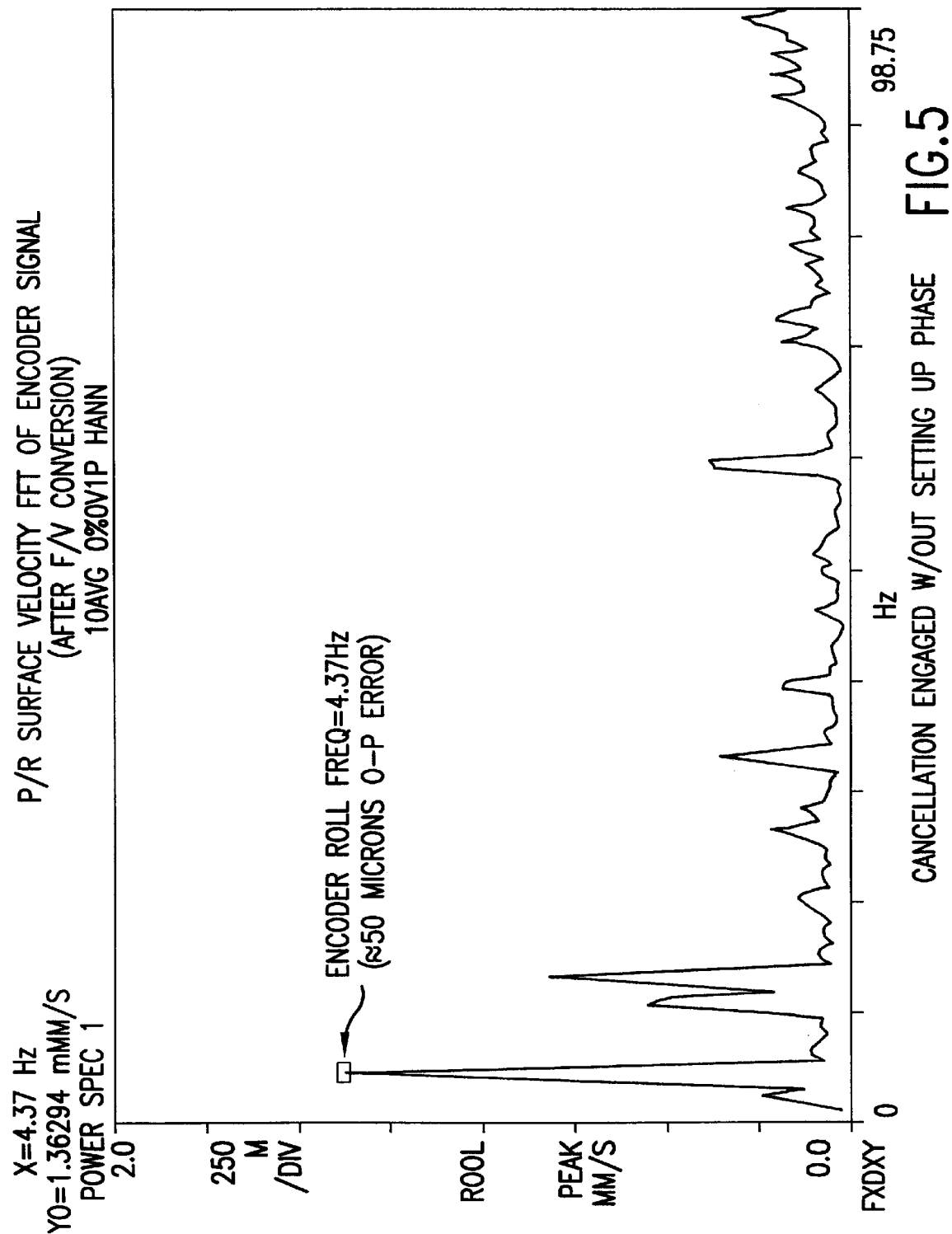
FIG. 5 is a graph similar to FIG. 4, but showing the increased amplitude of the rotary encoder error with a first correction.
Figure 6:
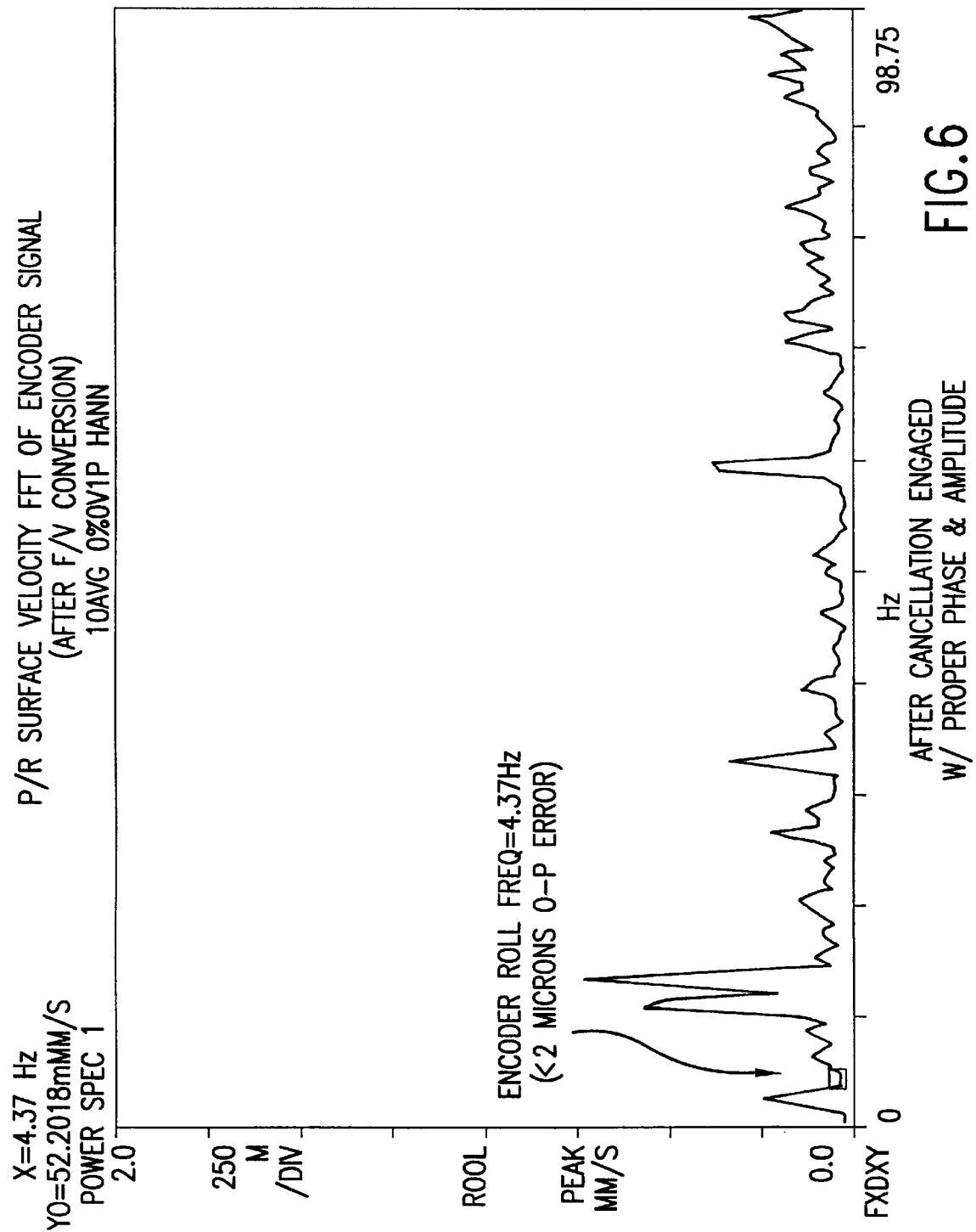
FIG. 6 is a graph similar to FIGS. 4 and 5, but showing the decreased amplitude of the rotary encoder error with a second correction.

FIGS. 4–6 are graphs of the results obtained in laboratory simulation using the embodiment shown in FIG. 3. FIGS. 4–6 are graphs of rotary encoder error frequency versus photoreceptor surface velocity based on the fast Fourier transform of the encoder signal 118, after the encoder signal 118 is converted from a digital square waveform to an analog voltage. In FIGS. 4–6, the phase of the rotary encoder error is not known, and thus the phase was determined experimentally.

FIG. 4 shows an uncorrected rotary encoder error amplitude of 694.17 microns per second occurring at a frequency of 4.37 Hz. Upon numerical integration, this error is approximately 25 microns from zero to peak (25 microns =694.17 microns per second/($2\pi \times 4.37$ Hz)). The rotary encoder error frequency of 4.37 Hz is directly related to the diameter of the encoder roll 110 and the nominal value of the photoreceptor surface velocity.

FIG. 5 shows a rotary encoder error amplitude of 1362.94 microns per second occurring at the rotary encoder error frequency of 4.37 Hz as a result of a first correction. As shown, the first correction increased the error from 694.17 microns per second to 1362.94 microns per second. The error with the first correction is approximately 50 microns from zero to peak. In the first correction, attempts to correct the rotary encoder error by adjusting the phase relationship between the sine value obtained from the normalized sine table 124 and the rotary encoder error actually increased the error. Thus, the phase relationship between the rotary encoder error and the normalized sine value was not offset by 180 degrees as desired, but was nearly zero (i.e., the sine value was nearly synchronized with the rotary encoder error, and thus the corrected rotary encoder error nearly doubled).

FIG. 6 shows a rotary encoder error amplitude of 52.08 microns per second at the rotary encoder error frequency of 4.37 Hz as a result of a second correction. As shown, the second correction substantially decreased the original rotary encoder error amplitude of 694.17 microns per second to 52.08 microns per second. The error with the second correction is less than 2 microns from zero to peak (i.e., within the background noise range of the measuring device). In the second correction, the desired offset phase relationship between the sine value used in correction and the rotary encoder error was obtained, and the rotary encoder error is substantially cancelled.

Figure 7:
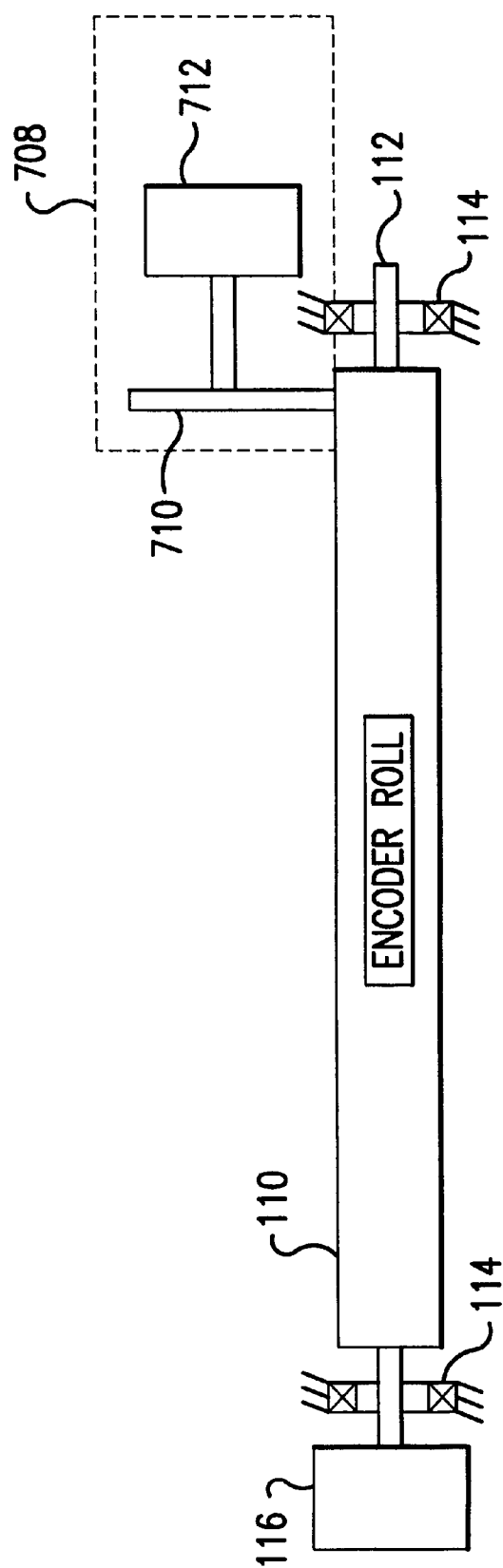
FIG. 7 is a schematic view showing a device for measuring actual encoder roll deviation.

In addition to the system and method described above in connection with FIGS. 3–6, the rotary encoder error can be determined in other ways. For example, the rotary encoder error can be determined, e.g., at the factory using a separate encoder system 708 comprised of a detecting element 710 and an encoder 712. Based on the results obtained from running a test print with the system shown in FIG. 7, the rotary encoder error for a specific encoder 116/encoder roll 110 can be determined. In particular, the amplitude and phase of the error can be measured from a pattern produced on the test print, and then stored in nonvolatile memory (e.g., the amplitude memory 130 and the phase memory 132, respectively) of the marking device for future correction.

Alternatively, the error can be measured by driving the moving surface at a constant open loop voltage and measuring the phase and amplitude of the rotary encoder error. Additional filtering and data reduction according to known methods would be conducted to determine the exact phase relationship.

As is known, if the marking device system includes a "marks-on-belt" (MOB) system, these registration marks could be used to determine the error. For an example of a MOB system, see commonly assigned U.S. Pat. No. 5,537, 190. With a MOB system, a series of chevrons or other suitable marks would be generated as toner images at known time intervals on the moving photoreceptor surface by running a test print, e.g., during a set-up phase. The number of marks used (and thus, the interval between adjacent marks) depends upon the resolution desired, noise in the system, etc. Essentially, the rotary encoder error is determined from deviations in the distances between adjacent marks placed at a known time interval.

The marks are sensed with a MOB sensor, which may be a split cell CCD or other suitable device. For an ideal rotary encoder (with no rotary encoder error), the distances between adjacent marks are the same. With actual rotary encoders, the distances vary in a periodic fashion. The pattern of the distance data is analyzed to determine a rotary encoder error frequency and further processed to determine the amplitude of the rotary encoder error according to known methods.

Replacement encoder 116/encoder roll 110 assemblies installed in the field can be calibrated by field technicians using a frequency to voltage converter and storing the phase and amplitude for the rotary encoder error of the new assembly in memory.

As shown in FIGS. 1 and 3, the encoder correction system and the components thereof can be implemented on a programmed general purpose computer, a special purpose computer, a programmed microprocessor or microcontroller and peripheral integrated circuit elements and ASIC or other integrated circuit, a digital signal processor, a hardwired electronic or logic circuit (such as a discrete element circuit), a programmable logic device such as a PLD, PLA, FPGA or PAL, or the like. In general, any device capable of implementing a finite state machine that is in turn capable of implementing the flowchart shown in FIG. 2 can be used to implement the encoder correction system.

Although this invention is described in conjunction with its specific embodiments thereof, many alternatives, modifications and variations will be apparent to those skilled in the art. Accordingly, the preferred embodiments of the invention as set forth above are intended to be illustrative, not limited. Various changes to the invention may be made without departing from its true spirit and scope as defined in the following claims.

What is claimed is:

1. A rotary encoder error compensation system for use in a marking device with a rotary encoder configured to generate an encoder signal indicating a detected position of a rotating element, the rotary encoder and rotating element forming a pair having a known rotary encoder error, the system comprising:

a memory that stores an amplitude and phase of the known rotary encoder error;

an error correction logic circuit that receives the encoder signal from the rotary encoder; and an error correction table linked to the error correction logic circuit, the table having normalized error correction values that are sine wave values;

wherein the error correction logic circuit accesses the error correction table based on the detected position of the rotating element and the corresponding phase of the known rotary encoder error and obtains one of the normalized error correction values corresponding to the detected position of the rotating element and the known rotary encoder error, the error correction logic circuit generating a corrected encoder signal based on the encoder signal received from the rotary encoder and the normalized error correction value.

2. The rotary encoder error compensation system of claim 1, wherein the sine wave values are based on a sine wave having an amplitude of unity.

3. The rotary encoder error compensation system of claim 1, wherein the normalized error correction value corresponding to the detected position is offset from the phase of the rotary encoder error by 180 degrees.

4. The rotary encoder error compensation system of claim 1, wherein the error correction logic circuit multiplies the normalized error correction value corresponding to the detected position by the amplitude of the rotary encoder error to determine a modulated delay.

5. The rotary encoder error compensation system of claim 4, wherein the error correction logic circuit adds the modulated delay to a fixed delay to determine a corrected encoder signal.

6. The rotary encoder error compensation system of claim 1, further comprising an amplitude memory that stores the amplitude and a phase memory that stores the phase.

7. The rotary encoder error compensation of claim 1, wherein the error correction circuit resets the phase upon receiving an index pulse from the rotary encoder.

8. A method for compensating for rotary encoder error in a marking device with a rotary encoder coupled to a rotating element, the rotary encoder and rotating element forming a pair having a known rotary encoder error, the method comprising:

provided an amplitude and phase of the known rotary encoder error in a memory;

detecting a position of the rotating element with the rotary encoder that generates an encoder signal;

obtaining a normalized error correction value corresponding to the detected position of the rotating element indicated by the encoder signal based on the phase of the known rotary encoder error with an error correction logic circuit linked to the rotary encoder; and generating a corrected encoder signal based on the encoder signal and the normalized correction value.

9. The method of claim 8, further comprising using the corrected encoder signal as a control parameter in control of the marking device.

10. The method of claim 8, wherein obtaining the normalized error correction value includes accessing an error correction table of normalized sine values.

11. The method of claim 8, wherein the normalized error correction value corresponding to the detected position is offset from the phase by 180 degrees.

12. The method of claim 8, further comprising multiplying the normalized error correction value by the corresponding amplitude of the rotary encoder error.

13. The method of claim 12, further comprising determining a corrected encoder signal by delaying the encoder signal by the sum of a fixed delay and a modulated delay, the modulated delay being the product of the normalized error correction value and the amplitude.

14. The method of claim 8, further comprising determining rotary encoder error by measuring the deviation of the rotating element with an error encoder, generating a digital error encoder signal, converting the digital error encoder signal to an analog error signal and obtaining the amplitude and phase of the analog error signal to form the known rotary encoder error.

15. The method of claim 8, further comprising determining rotary encoder error by processing a test print with the marking device and measuring an amplitude and a phase of the rotary encoder error from the test print to form the known rotary encoder error.

16. The method of claim 8, wherein the marking device includes a MOB sensor and the rotating element includes marks readable by the MOB sensor, further comprising determining rotary encoder error by measuring deviation in the marks with the MOB sensor to form the known rotary encoder error.

17. A rotary encoder error compensation system for use in a device with a rotary encoder that generates an encoder signal indicating a detected position of a rotating element, the rotary encoder and rotating element forming an encoder pair that has a known rotary encoder error, the compensation system comprising:

a memory that stores an amplitude and phase of the known rotary encoder error; and an error correction logic circuit that receives that encoder signal from the rotary encoder, wherein the error correction logic circuit obtains a normalized sine value for an angle offset 180 degrees from the known phase of the rotary encoder error at the detected position of the rotating element and generates a corrected encoder signal by multiplying the obtained sine value by the corresponding known amplitude of the rotary encoder error at the detected position.

18. The rotary encoder error compensation system of claim 17, wherein the sine value is obtained by accessing an error correction table of normalized sine values with an amplitude of unity and a phase shift of zero.

19. A marking device comprising the error compensation system of claim 17.

* * * * *